United States Patent [19]

Knobel et al.

[11] Patent Number: 4,806,571

[45] Date of Patent: Feb. 21, 1989

[54] ORGANIC COMPOSITION CONTAINING A FLUOROALKYL SULFONIC ACID SALT

[75] Inventors: Thomas M. Knobel; Mary K. Walker; Donald M. Maschmeyer, all of Lake Jackson, Tex.

[73] Assignee: The Dow Chemical Company, Midland, Mich.

[21] Appl. No.: 191,293

[22] Filed: May 6, 1988

[51] Int. Cl.$^4$ ............................................. C08G 18/14
[52] U.S. Cl. ................................. 521/107; 521/121; 524/127; 524/144; 524/145; 524/165; 524/710; 524/712; 524/745; 524/746; 252/182.15; 252/182.24; 252/182.27; 252/518
[58] Field of Search ............... 521/107, 121; 524/127, 524/144, 145, 165, 710, 712, 745, 746; 252/182.15, 182.24, 182.27, 518

[56] References Cited

U.S. PATENT DOCUMENTS

| | | | |
|---|---|---|---|
| 3,041,296 | 6/1962 | Lindlaw et al. | 260/215 |
| 3,572,499 | 3/1971 | Mondano | 161/213 |
| 3,589,906 | 6/1971 | McDowell | 96/87 |
| 3,666,478 | 5/1972 | Grob et al. | 96/114.5 |
| 3,884,699 | 5/1975 | Cavallo et al. | 96/87 |
| 4,165,411 | 8/1979 | Marans et al. | 521/107 |
| 4,247,656 | 1/1981 | Janssen | 521/174 |
| 4,313,978 | 2/1982 | Stevens et al. | 427/384 |
| 4,357,401 | 11/1982 | Andre et al. | 429/192 |
| 4,374,760 | 2/1983 | Charles | 252/511 |
| 4,438,223 | 3/1984 | Hunter | 521/92 |
| 4,484,990 | 11/1984 | Bultman et al. | 204/106 |
| 4,575,518 | 3/1986 | Rasshofer | 521/51 |
| 4,617,325 | 10/1986 | Knobel et al. | 521/107 |
| 4,618,630 | 10/1986 | Knobel et al. | 521/105 |
| 4,621,106 | 11/1986 | Fracalossi et al. | 521/130 |

FOREIGN PATENT DOCUMENTS 69 42411 9/1970 France .
78 32978 6/1980 France .
78 32977 6/1980 France .

OTHER PUBLICATIONS

U.S. application Ser. No. 938,221 filed 12-5-86, Saavedra et al.
U.S. application Ser. No. 938,222 filed 12-5-86, abandoned in favor of Ser. No. 95,379, filed 9-10-87, Efford.
U.S. application Ser. No. 39,563 filed 4-5-87, Vermeulen et al.
U.S. application Ser. No. 149,986 filed 1-29-88, Knobel et al.

Primary Examiner—Maurice J. Welsh

[57] ABSTRACT

An antistatic additive for polymers, particularly polyurethanes, is disclosed. The additive comprises an ionizable metal salt of a fluoroalkyl sulfonic acid and an enhancer. The enhancer is generally a salt or ester of a carboxylic acid or a phosphate ester.

40 Claims, No Drawings

ORGANIC COMPOSITION CONTAINING A FLUOROALKYL SULFONIC ACID SALT

BACKGROUND OF THE INVENTION

This invention relates to static dissipative polymers.

Most organic polymers are poor conductors of electricity. As such, they cannot be satisfactorily used without modification in applications which require a conductive or semi-conductive material, such as static dissipative materials.

Due to their beneficial properties such as low cost, easy processability, good strength and light weight, it is often desirable to substitute polymeric materials into applications which in the past required metals or other materials. Accordingly, it has been attempted to prepare semi-conductive or conductive polymers.

Conductivity has been imparted to polymers, for instance, by incorporating conductive fibers, particulates or powders into a polymer. Although good conductivity can be achieved in this manner, the high loadings of filler materials (generally 20% or more) needed to obtain such conductivity greatly alter the properties of the polymer, often making it unsuitable for its desired purpose. In addition, such highly filled polymers are often much more expensive than the unfilled polymer. Yet another problem encountered with certain such fillers, especially fibers, is they often break, oxidize or otherwise lose their effectiveness during processing or over time. Also, such fillers tend to slough from a polymer matrix and contaminate sensitive objects nearby, such as electronic equipment that may be packaged or stored in the conductive polymer.

It is also known to impart antistatic properties to polymers using amines, surfactants or quaternary ammonium compounds. When such a compound is incorporated into a polymer or used as a static dissipative surface treatment thereon, the compound generally exudes to the surface of the polymer, where it absorbs atmospheric moisture to form an electrolyte microlayer. The microlayer is generally sufficiently conductive to render the polymer static dissipative. However, such treatments are often removed from the polymer during its normal use, causing the polymer to lose its antistatic properties.

Another approach has been to incorporate ionic salts into a polymer to increase its conductivity. For example, in Dupon et al. *J. Elec. Chem. Soc.* 128:715 (1981) it is taught to incorporate salts such as sodium thiocyanate into a high molecular weight poly(ethylene oxide) to increase its conductivity. French Pat. No. 2,442,513-4 demonstrate the dissolution of mixed alkali metal thiocyanate salts into poly(alkylene oxide) polymers for the same reason. In these references, the concentration of salt is generally at least about 5 weight percent, and is preferably as high as about 25 weight percent. Such a high level of salt often imparts undesirable properties to the polymer, such as sensitivity to water. When such levels of salts are employed in a flexible polyurethane foam, the foam often fails, prunes or collapses due to the formation of undesired closed cells. U.S. Pat. Nos. 4,617,325 and 4,618,680 teach the use of enhancers to increase the static dissipative effectiveness of certain ionizable salts so that lower concentrations of the salts are necessary for static dissipation.

Although the use of such enhancers improve the conductivity of polymer compositions containing relatively low concentrations of salts, it would be desirable to further improve static dissipative polymer compositions such that the compositions maintain relatively high levels of conductivity with relatively low levels of salts after the polymer compositions have been exposed to elevated temperatures. Salts used to maintain such levels of conductivity would desirably also be stable in the presence of other additives, such as flame retardants, used in polymer compositions. Elevated temperatures often occur in production or processing of polymer compositions. It can also be desirable to incorporate antistatic additives as aqueous solutions.

SUMMARY OF THE INVENTION

In one aspect, the present invention is an organic polymer composition comprising an organic polymer having dispersed therein (a) at least one ionizable metal salt of a fluoroalkyl sulfonic acid (b) an enhancer comprising a phosphate ester, salt, a carboxylic acid or ester of a carboxylic acid.

In another aspect, the invention is an additive for increasing the conductivity of an organic polymer which comprises (a) at least one ionizable metal salt of a fluoroalkyl sulfonic acid and (b) an enhancer comprising a phosphate ester, salt of a carboxylic acid or ester of a carboxylic acid.

It has been found that by employing a fluoroalkyl sulfonic acid salt and enhancer as described herein, a substantial increase in conductivity or static dissipative properties over that of the organic polymer alone is obtained. Surprisingly, the conductivity is generally further increased after the polymer is heated. Fluoroalkyl sulfonic acid salts are also generally stable in polymer compositions also containing other additives useful in such compositions, said additives being exemplified by flame retardant additives.

DETAILED DESCRIPTION OF THE INVENTION

The additive of this invention comprises, as one component, an ionizable fluoroalkyl sulfonic acid salt. Said salt is one containing at least one metal cation which is in ionic association with at least one fluoroalkyl sulfonate anion. By ionizable, it is meant that the salt is one which provides ions which are sufficiently mobile to transport an electrical charge in the presence of an electric field.

The cation can be any metal which forms an ionizable salt with one or more fluoroalkyl sulfonate anions, including metals in Row 2, groups IA and IIA; Row 3, groups IA, IIA and IIIA; Row 4, groups IA-IVA and IB-VIII B; Rows 5 and 6, groups IA-VA and IB-VIII B; and the lanthanide series in the Periodic Table of the Elements. Preferably, the metal is an alkali metal, an alkaline earth metal, Co, Ni, Fe, Cu, Cd, Zn, Sn, Al or Ag. More preferably the metal is an alkali metal.

The anion is a fluoroalkyl sulfonate which forms an ionizable salt with the metal cation. The fluoroalkyl sulfonic acid anion (fluoroalkyl sulfonate) is suitably any fluoroalkyl sulfonic acid anion compatible with a specific composition in which it is used. Generally, such fluoroalkyl sulfonates have from about one to about twenty carbon atoms and are either straight chained, branched or cyclic. Fluoroalkyl sulfonates are sulfonate anions having an alkyl group having fluorine substitution, that is, fluorine atoms bonded to the carbon atoms of the alkyl groups. The alkyl groups, optionally, also have hydrogen atoms and/or other halogen atoms bonded to the carbon atoms. Preferably, at least about 85% (by number) of the atoms other than carbon which are bonded to carbon atoms of the fluoroalkyl groups are halogen, preferably fluorine. More preferably, the fluoroalkyl groups are perhaloalkyl groups, that is, alkyl groups having only halogen substitution. Suitable halogens include fluorine, chlorine, bromine and iodine, preferably fluorine and chlorine. Suitable fluoroalkyl sulfonic acid anions include, for instance, $C_2HF_4SO_3^-$, $C_2HClF_3SO_3^-$, $C_3H_2F_5SO_3^-$, $C_4H_2F_7SO_3^-$, $C_5H_2F_9SO_3^-$, $C_7ClF_{14}SO_3^-$, $C_8Cl_2H_2F_{13}SO_3^-$, $C_{20}ClHF_{40}SO_3^-$ and the like.

The fluoroalkyl groups are most preferably perfluoroalkyl groups. Exemplary perfluoroalkyl sulfonic acid anions include, for example $CF_3SO_3^-$ (triflate), $C_2F_5SO_3^-$, $C_5F_{11}SO_3^-$, $C_7F_{15}SO_3^-$, $C_8F_{17}SO_3^-$, $C_9F_{19}SO_3^-$, $C_{20}F_{41}SO_3^-$ and the like, isomers thereof and mixtures thereof. The salts of perfluoroalkyl sulfonates preferably have from about 1 to about 20, more preferably from about 1 to about 10, carbon atoms for reasons of availability and compatibility with polymers. Within that range of perfluoroalkyl sulfonic acid salts, a salt or mixture of salts, is generally chosen for its compatibility with and resistance to leaching or extraction from the polymer or blend in which it is used. For instance, a mixture of perfluoroalkyl sulfonates having from about 5 to about 10 carbon atoms is most perferred for use in polyurethanes. In copolymers of ethylene and carbon monoxide and blends thereof with other polymers, however, triflates are generally most preferred. Exemplary salts include $NaCF_3SO_3$ (sodium triflate), $KC_6F_{13}SO_3$, $LiC_8F_{17}SO_3$, $NaC_9F_{19}SO_3$, and the like. Sodium and potassium perfluoroalkyl sulfonate having from about one to about 10 carbon atoms are most preferred.

The second component of the antistatic additives of the invention is an enhancer. An enhancer is a compound which does not substantially increase the conductivity of the polymer in the absence of the fluoroalkyl sulfonate salt, but substantially increases the conductivity of the polymer containing the salt. The enhancer preferably comprises a salt or ester of a carboxylic acid or a phosphate ester in which the fluoroalkyl sulfonate salt is soluble or dispersible, preferably soluble. Relatively lower levels of the salts can, thus be used to achieve a given increase in conductivity with enhancers than can be used without enhancers.

The enhancer is considered not to substantially increase the conductivity of a polymer in the absence of an ionizable salt if the conductivity of the polymer containing the enhancer is not more than 100 times that of the polymer alone, if the polymer containing the enhancer (but no ionizable salt) is too nonconductive to be measured for static dissipation according to the test described herein, or if the polymer containing the enhancer (but no ionizable salt) dissipates 99% of an applied static charge in 60 seconds or greater.

Suitable enhancers include salts or esters of an organic acid. Advantageously, said salt or ester contains about 6-30 carbon atoms. Preferably, the salt is one of a $C_6-C_{30}$ carboxylic acid represented by the structure $$(RCO^-)_nM^{n+} \qquad (I)$$

wherein M is a metal ion, n is a number representing the valence of the metal ion and R is an organic radical containing 5-29 carbon atoms.

The group R advantageously is a $C_8-C_{22}$, preferably $C_{12}-C_{22}$ aliphatic hydrocarbyl group. More preferably, the salt is a fatty acid salt, and is most preferably an alkali metal salt of a fatty acid. Suitable as the salt of a $C_6-C_{30}$ carboxylic acid are, for example, sodium oleate, potassium oleate, sodium stearate, potassium stearate, sodium laurate, potassium laurate, sodium linoleate, and the like.

Suitable esters include those represented by the structure $$R^2(-\overset{O}{\underset{\|}{C}}-OR^1)_m \qquad (II)$$

wherein each $R_1$ is independently an inertly substituted organic group, m is a number from about 1 to 3, preferably 2 and $R^2$ is an inertly substituted organic radical containing about 4-29 carbon atoms. Preferred are esters of dicarboxylic acids having from about 6 to 20 carbon esters.

The group $R^2$ can be aliphatic, cycloaliphatic, aromatic, aliphatic-substituted aromatic, aromatic-substituted aliphatic, and the like. Preferably, however, the group $R^2$ is an inertly substituted aliphatic hydrocarbyl group or an inertly substituted aromatic group.

By "inertly substituted", it is meant that the group or molecule referred to contains no substituent groups which interfere with the enhancing function of the group or molecule, undesirably reacts with the polymer in which it is employed, with other components therein, or significantly interferes with the preparation of such polymer its subsequent processing, or its properties. Suitable inert substituent groups which may be present in the enhancer include, for example ester, ketone, ether or carboxylic acid groups, aromatic groups, tertiary amine groups, carbon-carbon double bonds, halogen, and the like. The enhancer may, if desired, contain a functional group such as an isocyanate group, hydroxyl group or the like which can react with the polymer to bond the enhancer to the polymer network.

When $R^2$ is an aliphatic hydrocarbyl group, it preferably contains 5-21 carbon atoms, and more preferably 5-11 carbon atoms, when the acid is monofunctional (i.e. m is 1) and from about 4-20, preferably 4-10 carbon atoms when the acid is difunctional (i.e. m is 2). The carboxylic acid is preferably a fatty acid.

When the group $R^2$ is an inertly substituted aromatic group it advantageously contains one or more aromatic rings which may contain aliphatic side chains. Preferably, when $R^2$ is an aromatic group, it contains from about 6-22 carbon atoms, more preferably 6-12 carbon atoms (including those in side chains, if any). Most preferably, the group $R^2$, when aromatic, is a phenyl group and the ester is one of benzoic, phthalic or terephthalic acid. When a diester such as represented in Structure III is used, the $R^2$ groups are most preferably inertly substituted aromatic groups as described in this paragraph.

The group $R^1$ is advantageously an inertly substituted organic group. Preferably the group $R^1$ is an inertly substituted hydrocarbyl or poly(oxyalkylene) group having from about 2-20, preferably 2-10 carbon atoms. More preferably, $R^1$ is a $C_{2-4}$ alkyl group or a polymer of ethylene oxide, propylene oxide, butylene oxide or mixture thereof having 2-10 carbon atoms. Such polymer may be hydroxyl-terminated but is more preferably terminated with an alkyl group.

Suitable esters of terephthalic acid and trimellitic acid according to Structure II are the subject of U.S. Pat. No. 4,620,026, which is incorporated herein by reference.

Also suitable are diesters represented by the structure

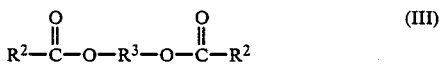

wherein each $R^2$ is independently an organic radical as defined hereinbefore and $R^3$ is an inertly substituted organic diradical. Advantageously, the group $R^3$ is an alkylene diradical, a alkylene ether diradical or polyether diradical. The group $R^3$ advantageously contains from about 2-20, preferably 2-10 carbon atoms.

Exemplary esters include, for example, methyl stearate, ethyl stearate, methyl oleate, ethyl oleate, n-butyl oleate, t-butyl oleate, methyl laurate, ethyl laurate, methyl linoleate, ethyl linoleate, methyl palmitate and other fatty acid esters, methyl phthalate, ethyl phthalate, methoxy ethyl phthalate, ethoxyethylphthalate, di(ethoxyalkyl)phthalate, di(butoxyethyl) phthalate, di(butoxyethoxyethyl)phthalate, di(butoxyethyl)adipate, dioctyl phthalate, di(butoxyethoxyethyl)adipate, di(butoxyethyl) glutinate, di(butoxyethyl)sebacate, dibutylterephthalate, and the like. Also suitable are diesters prepared from a hydroxyl terminated polyether and two moles of phthalic or terephthalic acid.

More preferably, the enhancers are phosphate esters and diphosphate esters represented by the structures

wherein each $R^4$ is independently an inertly substituted organic radical, preferably a $C_2$–$C_4$ alkyl or haloalkyl radical, and $R^5$ is an inertly substituted organic diradical, preferably an alkylene or alkyl ether diradical. Suitable phosphate esters and diesters include triethylphosphate, tributylphosphate, tris(dichloroiospropyl)phosphate, tributoxyethyl phosphate, di(2-chloroethyl)phosphoro-ethyl di(2-chloroethyl)phosphate and the like. The last compound is sold commercially as Thermolin ® 101, commercially available from Olin Chemical.

Fluoroalkyl sulfonic acid salts are used with these enhancers in any ratio such that when an effective amount of the additive is incorporated into a polymer, the conductivity of the polymer is greater than that of a like polymer containing only the ionizable salt. Generally, the additive contains about 0.5-100, preferably about 1-25 moles of said enhancer per mole of ionizable salt. An antistatic additive for a polymer composition may be formed from fluoroalkyl sulfonate salts and the enhancers in a ratio effective for increasing the conductivity of the polymer.

Such antistatic additives may be added to an organic polymer as a mixture of salt and enhancer, or, alternatively, the salt and enhancer may be added separately to the polymer or to a component used to make the polymer or blend thereof. The water solubility of fluoroalkyl sulfonic acid salts, particularly alkali metal perfluoroalkyl sulfonates having from about 1 to about 10 carbon atoms facilitates addition of the salts in an aqueous solution.

Suitable organic polymers are any into which the antistatic additive or fluoroalkyl sulfonate salt can be dispersed, preferably ionized. Ability to disperse the antistatic additive is to a large extent related to the compatibility of the enhancer and the organic polymer. Accordingly, it is generally desirable to select the organic polymer and the enhancer together so that the two components are compatible. Alternatively, the antistatic agent and the organic polymer can be compatibilized by use of a cosolvent, such as water or a glycol, or other material which compatibilize the polymer and the antistatic agent. An admixture of fluoroalkyl sulfonic acid salt and enhancer, optionally with cosolvent, is incorporated into an already prepared polymer, e.g. by melt bending, extrusion or the like. The cosolvent can be removed, e.g. by devolatilization, extrusion and the like; or it can be left in the polymer composition. Alternatively, the admixture is mixed with a polymerforming reaction mixture or component thereof.

The fluoroalkyl sulfonic acid salt may, optionally, be formed in a polymer or component thereof by reaction of the fluoroalkyl sulfonic acid with the hydroxide of a metal suitable for forming the salt. The acid and hydroxide are, thus, incorporated separately into the polymer or a component thereof. Alternatively, the salt is similarly formed in any material to be added to the polymer composition.

Sufficient of the additive of this invention is used to increase the conductivity of the product polymer. In general, the conductivity of the polymer is increased when the polymer contains from about 0.01-10, preferably 0.05-5, more preferably 0.05-1.5 percent by weight of the fluoroalkyl sulfonic acid salt. As stated hereinbefore, the polymer advantageously contains from about 0.5-100, preferably 1-25 moles of the enhancer per mole fluoroalkyl sulfonic acid salt. The effect of a fluoroalkyl sulfonic acid salt and enhancer on the physical properties of some polymer compositions may limit the amount of salt and enhancer suitable for use therein.

Addition polymers and condensation polymers are useful herein as are either thermoplastic or thermosetting polymers. Exemplary of the polymers that are useful herein are polyolefins such as polyethylene, polypropylene and the like, polymers of conjugated dienes such as butadiene; poly(vinyl aromatics) such as polystyrene, poly(vinyl toluene) and the like; polycarbonates, acrylic resins such as polymers of acrylic and methacrylic acid and alkyl or hydroxylethyl esters thereof; polymers of vinyl chloride, vinylidene chloride or mixtures thereof; polyesters; copolymers of ethylene with carbon monoxide or vinyl alcohol; and polyurethanes or other polymers based on an organic polyisocyanate. Blends, alloys and copolymers of the foregoing polymers are also useful.

For the purpose of this invention the term polymers based on organic polyisocyanates and "organic polyisocyanate polymers" are understood to mean those which can be obtained by reaction of an organic polyisocyanate with an organic compound which contains at least two Zerewitinoff active hydrogran atoms, e.g. polycarbodiimides, polyisocyanurates, polyureas, polybiurets, polyamides, polyallophanates or polyurethanes or polymers containing a mixture of urethane, urea, allophanate, biuret, amide, carbodiimide and/or isocyanurate groups, and any other polymer based on a polyisocyanate. The process described here is particularly suitable for the production of polymers which contain urethane and urea groups prepared from a reaction mixture containing an organic polyisocyanate.

All such polymers based on organic polyisocyanates are also referred to herein by the shorthand term "polyurethanes".

In the preparation of polyurethane foams containing the antistatic additive of this invention, said additive is advantageously present in a reaction mixture of an active hydrogen component (defined hereinafter) and a polyisocyanate. Since in preparing such reaction mixture it is generally preferably to add all the components in as few streams as possible, it is generally preferred to pre-mix the additive of this invention with one or more active hydrogen components to form an active hydrogen-containing composition which is then reacted with the polyisocyanate. Although the method of combining the antistatic additive and active hydrogen components is not critical, the fluoroalkyl sulfonic acid salt is conveniently dissolved in water and added to the active hydrogen components. The water may, for instance, be that used as a blowing agent or active hydrogen component for a foam. Alternatively, all or part of the water is evaporated from the active hydrogen component leaving the antistatic additive in the active hydrogen component.

An active hydrogen component includes any polyfunctional compound having at least two active hydrogen atoms. For the purposes of this invention, an active hydrogen moiety refers to a moiety containing a hydrogen atom which, because of its position in the molecule, displays significant activity according to the Zerewitinoff test described by Kohler et al. in the *Journal of American Chemical Society*, Vol. 49, page 3181 (1927). Illustrative of such active hydrogen moieties are —COOH, —OH, —NH$_2$, —NH—, —CONH$_2$, —SH and —CONH—. Typical active hydrogen components include polyols, polyamines, polyamides, polymercaptans, polyacids and mixtures thereof.

The fluoroalkyl sulfonic acid salt may be added to the active hydrogen component alone or as a mixture thereof with an enhancer in the desired proportions or preferably as a "concentrate" comprising the salt and enhancer dissolved or dispersed in an active hydrogen component or mixture thereof. In such "concentrate", the concentration of salt and enhancer is somewhat higher than that normally present in the active hydrogen-containing composition which is reacted with the polyisocyanate. Such concentrate normally contains from about 0.5–50, preferably about 1–25, more preferably about 1–10 percent by weight of the fluoroalkyl sulfonate salt, and a corresponding amount of enhancer. A "B-side" composition for preparing polyurethanes typically contains about 0.015–20, preferably about 0.075–10, most preferably about 0.1–1 percent by weight of the fluoroalkyl sulfonate salt. If desired, each component of the additive of this invention may be added individually to the active hydrogen component.

In making a polyurethane polymer containing fluoroalkyl sulfonic acid salts, the active hydrogen components, polyisocyanates, and other components, if any, include those known to those skilled in the art for preparation of polyurethane polymers.

Suitable active hydrogen components include polyether polyols, polyester polyols, polyhydroxyl-containing phosphorous compounds, hydroxyl-terminated acetal resins, hydroxyl terminated amines and polyamines, the corresponding amine-terminated polyether and/or polyester polyols, the so-called polymer or copolymer polyols which comprise a dispersion of an addition polymer as copolymer in a continuous active hydrogen component phase, as well as other active hydrogen-containing compounds which are known to be useful in the preparation of polyurethane polymers. Examples of these and other suitable active hydrogen components are described more fully in U.S. Pat. No. 4,394,491, particularly in columns 3–5 thereof. Suitable copolymer polyols include those described in U.S. Pat. Nos. Re. 29,118, Re. 28,715 and 4,394,491.

The molecular weight and functionality of the active hydrogen component will depend on the properties desired in the polyurethanes. For example, the formation of flexible polyurethanes is favored by using relatively high equivalent weight (ie. 250–10,000) active hydrogen components and/or those having relatively low (2–4) functionality. More rigid polyurethanes are generally prepared from low equivalent weight (i.e. 50–250) active hydrogen components and/or those having a high functionality (i.e. 3–16). Mixtures of active hydrogen components are suitably used to achieve a desired average functionality.

Organic polyisocyanates which may be employed include aromatic, aliphatic and cycloaliphatic polyisocyanates and combinations thereof. Representative of these types are diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenyl-methane-4,4'-diisocyanate, 4,4'-biphenylene diisocyanate, 3,3'-dimethoxy-4,4'-biphenyl diisocyanate, 3,3'-dimethyl-4,4'-diphenyl diisocyanate, and 3,3'-dimethyldiphenylpropane- 4,4',4'-diisocyanate; the triisocyanate polymethylene polyphenylisocyanate and tolylene-2,4,6-tiisocyanate; and the tetraisocyanates such as 4,4'-dimethyldiphenylmethane2,2',5,5'-tetraisocyanate and the like.

A crude polyisocyanate may also be used in the practice of the present invention, such as the crude toluene diisocyanate obtained by the phosgenation of a mixture of toluene diamines or the crude diphenylmethylene diisocyanate obtained by the phosgenation of crude diphenylmethylenediamine. The preferred undistilled or crude isocyanates are disclosed in U.S. Pat. No. 3,215,652.

Especially preferred are methylene-bridged polyphenyl polyisocyanates, due to their ability to crosslink the polyurethane. The isocyanate index (ratio of equivalents of isocyanates to equivalents of active hydrogens) is advantageously from about 0.8–10, preferably about 1.0–4.0, more preferably about 1.0–1.25.

Prepolymers or quasi-prepolymers of the foregoing polyisocyanates are also useful herein.

In addition to the aforementioned active hydrogen component, polyisocyanate and additive, various additional ingredients may be employed in preparing the polyurethane polymer.

The urethane reaction of polyisocyanate with an active hydrogen component is advantageously carried out in the presence of an amount of urethane-type catalyst which is effective to catalyze the reaction of the active hydrogen component with the polyisocyanate.

Any suitable urethane catalyst may be used including tertiary amines, such as for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropyl amine, N,N-dimethyl-N',N'-methyl isopropyl propylenediamine, N,N-diethyl-3-diethylaminopropyl amine, dimethyl benzyl amine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408. A catalyst for the trimerization of polyisocyanates, such as alkali metal alkoxides, may also optionally be employed herein.

If a polyurethane foam is to be prepared, a blowing agent is employed. Such blowing agent comprises an inert gas, a low boiling organic liquid such as methylene chloride or trichlorofluoromethane, and/or a chemical blowing agent such as water, peroxides or azo compounds which react during the urethane polymerization reaction to generate a gas. Water is a preferred blowing agent and is typically used in amounts of from about 0 to about 6 parts by weight per 100 parts of active hydrogen components. When water is present, it is considered part of the active hydrogen containing composition of a polyurethane forming composition.

In preparing a polyurethane foam, a wetting agent(s) or surface-active agent(s) is generally necessary since in the absence of same, the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alocohls, tertiary amine or alkylolamine salts of long chain alkyl acid sulfate esters, alkyl sulfonic esters and alkyl arylsulfonic acids.

Other optional ingredients include conventional additives such as pigments, fillers, flame retardant, stabilizers, additional cell openers and the like.

Such catalysts, blowing agents, surfactants and other optional ingredients are preferably blended with the active hydrogen component before the reaction thereof with the polyisocyanate.

The resulting polyurethane polymer is substantially more conductive than a like polymer which does not contain the additive of this invention.

When the antistatic additive of this invention is incorporated into a polymer so that the polymer contains about 0.01–10% by weight of a fluoroalkyl sulfonic acid salt, the conductivity of the polymer generally increases by about a factor of about 100 to 100 million ($10^2$–$10^8$).

The increased conductivity of the polymer containing a fluoroalkyl sulfonic acid salt and an enhancer is also seen in its ability to dissipate a static charge. Although the polymer itself often is incapable of dissipating a static charge, the polymer containing the additive is able to rapidly dissipate static electricity. Often such a polymer containing the additive can dissipate 99% of an applied static charge in a relatively short time, i.e. less than about 50, more preferably less than about 15, most preferably less than about 2 seconds. For the purpose of this invention, static decay is measured according to Federal Test Standard (FTS) 101C, method 4046.1, omitting the water step described therein. Other methods are also useful to evaluate antistatic properties. In general, the advantages of this invention are obtained without significant adverse affects on the physical properties of the polymer.

This increase in conductivity of a polymer composition containing a fluoroalkyl sulfonic acid salt is generally maintained after the polymer is exposed to elevated temperatures. Preferably, the conductivity is increased upon heating. Use of perfluoroalkyl sulfonic acid salts to impart conductivity to a polymer composition is especially advantageous when the polymer is to be heated above about 110° C., and even more advantageous when the composition is to be heated above about 135° C., preferably 150° C. Such temperatures are often reached in injection molding, blow molding and thermoforming processes. Elevated temperatures in excess of about 135° C. are also encountered, for instance, in curing polyurethane or polyurethanepolyurea foams using water or chlorofluorocarbons as blowing agents to yield foams having relatively low densities, for instance densities below about 1.5 pounds per cubic foot. Perfluoroalkyl sulfonic acid salts are, therefore, particularly useful in polymers to be prepared or shaped by such processes.

Static dissipation of 99% of a 5000 volt charge in less than about 50, preferably less than about 15, most preferably less than about 2 seconds is preferably also maintained by a polymer composition containing a fluoroalkyl sulfonate salt after exposure to ultra violet (UV) light and/or after washing with water. Such static dissipation times are preferably maintained after exposure to sunlight for about 8 hours, preferably about a (24 hour) day, most preferably about 5 days, or after exposusre to a UV radiation source according to the procedure of ASTM-G53 for about 8 hours, preferably about 16 hours, most preferably about 24 hours. Also such static dissipation times are preferably retained after samples of polymer composition are exposed to, preferably soaked in, water for a period of at least about 8 hours, more preferably at least about 24 hours, most preferably at least about 48 hours. Static dissipation is measured after such samples are brought to the relative humidity specified by FTS 101C, method 4046.1.

Polymers containing fluoroalkyl sulfonate antistatic additives are useful, for example, for preparing antistatic packaging, shelving or storage containers for materials such as electronic devices which are sensitive to or damaged by discharge of static electricity, or exposure to static electrical fields. This invention is also useful in making adhesives, elastomers, rigid, semirigid and flexible foams, films, coatings, especially coatings for engineering thermoplastics, and the like. Such materials are useful to prepare equipment for handling flammable materials, antistatic adhesives, antistatic carpet or pad, other flooring and the like.

The following examples are provided to illustrate the invention and not to limit the scope thereof. All parts and percentages are by weight unless otherwise indicated.

EXAMPLE 1

Preparation of Polyurethane Foams Incorporating Alkali Metal Triflates (TriFluoroMethane Sulfonic Acid Salts)

Solutions of the compositions outlined in Table 1 are prepared by thoroughly mixing the indicated ingredients. In Table 1, Polyol A is a poly(propylene oxide) triol having an average molecular weight of about 700 and a hydroxyl number of about 234, commercially available from The Dow Chemical Company under the trade designation Voranol ® 2070. Polyol B is a triol, produced from a mixture of about 87% by weight propylene oxide and about 13 weight percent ethylene oxide, having an average molecular weight of about 3100 and a hydroxyl number of about 56, commercially available from The Dow Chemical Company under the trade designation Voranol ® 3137. The enhancer is di(butoxyethoxyethyl)adipate (DBEEA).

TABLE 1

| | SOLUTIONS USED | | | | |
|---|---|---|---|---|---|
| Solution Number | Polyol A (grams) | Polyol B (grams) | Enhancer (grams) | Na Triflate (grams) | Li Triflate (grams) |
| S1 | 15.4 | 43.8 | 38.5 | 3.85 | 0 |
| S2 | 15.4 | 43.8 | 38.5 | 5.77 | 0 |
| S3 | 15.4 | 43.8 | 38.5 | 0 | 3.85 |
| S4 | 15.4 | 43.8 | 38.5 | 0 | 5.77 |
| S5 | 15.4 | 43.8 | 38.5 | 2.31 | 0 |
| S6 | 15.4 | 43.8 | 38.5 | 0 | 2.31 |

A masterbatch is formed from 1500 grams (g) of the polyol designated Polyol B in Table 1, 60 g of water, 15 g of polysiloxane polyalkylene oxide block copolymer commercially available from Goldschmidt A.G. under the trade designation Tegostab ® BF 2370, and 3.45 g of a mixture of 3 parts of a mixture of 33% by weight triethylene diamine in dipropylene glycol commercially available from Air Products and Chemicals under the trade designation DABCO ® 33-LV to one part of a mixture of 70% by weight bis(dimethylaminoethyl) ether in dipropylene glycol commercially available from Union Carbide Corp. under the trade designation NIAX ® A-1 denoted herein as amine catalyst A. The masterbatch is mechanically shaken for 10 minutes. Meanwhile, a sample of the amount indicated in Table 2 of a toluene diisocyanate (TDI), which is about 80 % 2,4-isomer and about 20% 2,6-isomer, is measured into a beaker and set aside.

A sample of 105.23 g of masterbatch is measured into a one quart (0.946 liter) paper cut. Ten grams of S1 of Table 1 is added to the sample of masterbatch to form a mixture which is stirred for 15 seconds using a small electric mixer. Stirring is stopped for addition of 0.259 of stannous octoate catalyst, commercially available from M&T Chemical, under the trade designation T-9 and designated "Tin Catalyst" in Table 2. The sample of diisocyanate is added quickly to form a mixture which is stirred for 5 seconds, after which, stirring is stopped. The mixture is then poured into an 80 ounce (oz.) (2.4 liter (1)) carton and allowed to foam at room temperature. A rise time is measured from addition of the diisocyanate until rising is complete as demonstrated by "blow off" or release of gases formed in foaming. This procedure is repeated for each of Samples 2–8 in Table 2, using the indicated solutions of Table 1.

After 24 hours at ambient temperature, the cartons are torn off the foams. Samples measuring 3×5×1 inches are cut from each foam and conditioned for 24 hours at 9% relative humidity and a temperature of 21° C. Then, the static decay is measured according to Federal Test Standard (FTS) 101C, method 4046.1, omitting the water step described therein. After a heat treatment at 350° F. (177° C.) for an hour, and again after a heat treatment at 220° F. (104° C.) for 24 hours, the heat age static decay is measured by the same procedure.

Air flow is measured, on a separate sample, measuring 2×2×1 inch, according to ASTM D 3574-86, test G, in cubic feet per minute (cfm) (1 cfm is about 0.47 liters per second (l/sec.)) and given in Table 2.

TABLE 2

| | | | | | | | Foam Formulation and Properties | | | | |
|---|---|---|---|---|---|---|---|---|---|---|---|
| Sample No. | Soln. No. | Soln. g | Triflate type | Triflate grams | TDI | Tin catalyst | Rise Time Sec. | Air Flow ft.$^3$/min. | Density lb/ft.$^3$ | Static Decay time (sec.) | Static Decay time after 350° F. | Static Decay time after 220° F. |
| 1 | S5 | 10 | Na | 0.23 | 53.7 | 0.25 | 97 | 3.8 | 1.68 | 2.55 | 1.75 | 2.92 |
| 2 | S5 | 10 | Na | 0.23 | 53.7 | 0.275 | 93 | 2.2 | 1.61 | 2.93 | 1.96 | 3.22 |
| 3 | S6 | 10 | Li | 0.23 | 53.7 | 0.25 | 111 | 4.3 | 1.72 | 2.03 | 1.4 | 2.45 |
| 4 | S6 | 10 | Li | 0.23 | 53.7 | 0.275 | 99 | 2.1 | 1.69 | 2.34 | 1.67 | 2.58 |
| 5 | S1 | 10.15 | Na | 0.39 | 53.7 | 0.225 | 139 | 6.0 | N.D. | 2.25 | 1.07 | N.D. |
| 6 | S2 | 10.35 | Na | 0.60 | 53.7 | 0.25 | 123 | 1.5 | N.D. | 2.23 | 0.96 | N.D. |
| 7 | S3 | 10.15 | Li | 0.39 | 53.7 | 0.25 | 132 | 2.8 | N.D. | 2.42 | 1.28 | N.D. |
| 8 | S4 | 10.35 | Li | 0.60 | 53.7 | 0.25 | 130 | 0.53 | N.D. | 2.19 | 0.99 | N.D. |

"N.D." means that the data was not determined.

The data in Table 2 show that when sodium and lithium triflate are used as antistatic additives and enhanced with DBEEA, static decay times are decreased after samples are heated to 350° F.

EXAMPLE 2

Preparation of a Polyurethane Foam Incorporating a Mixture of Potassium Perfluoroalkyl Sulfonates A solution is formed of 2.3 g of a mixture of isomers of potassium salts of perfluoroalkylsulfonic acids commercially available from 3M Corp. under the trade designation Fluorad ® FC-98* (Chemical Abstracts registry number 12751-11-0) and 38.5 g of di(butoxyethoxyethyl) adipate (DBEEA) in 15.4 g of Polyol A and 43.8 g of Polyol B as identified in Example 1. The solution is designated as S9.

*Potassium emission spectroscopy shows Fluorad ® FC-98 to have an average atomic composition of $C_6F_{13}SO_3K$. The carbon to fluorine ratio is calculated to account for the difference in weight between the sample and potassium detected while having integer subscripts for all atoms represented in the formula.

Foams are prepared as in Example 1 using the formulations of Table 3. Samples, cut as in Example 1, are heated and conditioned as indicated in the table. Static decay times are then measured as in Example 1.

The samples are heat aged as in Example 1 and the static decay times are again measured.

TABLE 3

| Effects of Heat Aging on Antistatic Foams | |
|---|---|
| Sample No. | 9 |
| Solution No. | S9 |
| Soln. (g) | 10 |
| Polyol B (g) | 100 |
| TDI (g) | 48.9 |
| Water | 3.6 |
| Silicone | 1.0 |
| Tin Catalyst | 0.25 |
| Amine Catalyst A | 0.10 |
| Conditioning* | 48 hr./ 12% R.H. |
| Static decay time (sec.) | 1.33 |
| Static decay time after 350° F. | 0.74 |
| Static decay time after 220° F. | 1.12 |

*R.H. is relative humidity

Table 3 shows that when Fluorad ® FC-98 is used with DBEEA as an antistatic additive, static dissipation is improved after heating.

EXAMPLE 3

Exposure of Foams Containing a Mixture of Perfluoroalkyl Sulfonate Salts to UV Light Solution S10 is prepared by thoroughly mixing 2.3 g Fluorad ® FC-98, 38.5 g DBEEA, 15.4 g of Polyol A and 43.8 g of Polyol B as identified in Example 1. Additionally, a solution of 2.3 g sodium tetraphenylboron, 38.5 g DBEEA, 15.4 g of Polyol A and 43.8 g of Polyol B is designated S11.

Foams are prepared as in Example 1, using the formulations in Table 4. The samples are cut as in Example 1 and conditioned at 15% relative humidity for 24 hours. The static decay time is determined as in Example 1. The samples are then exposed to a FS-40 fluorescent light UV light according to the procedure of ASTM G53 for the periods of time indicated in Table 4. After each time period, the static decay time is measured as in Example 1.

TABLE 4

| EFFECTS OF UV LIGHT ON ANTISTATIC FOAMS | | |
|---|---|---|
| Sample No. | 10 | A* |
| Solution No. | S10 | S11 |
| Soln. (g) | 10 | 10 |
| Polyol B (g) | 100 | 100 |
| TDI | 48.9 | 48.9 |
| Water | 3.6 | 3.6 |
| Silicone | 1.0 | 1.0 |
| Tin Catalyst | 0.20 | 0.20 |
| Amine Catalyst A | 0.10 | 0.10 |
| Static Decay After UV exposure: | | |
| 0 hr. | 1.47 | — |
| 2 hr. | 2.13 | 0.33 |
| 4 hr. | 2.22 | 0.84 |
| 6 hr. | 1.94 | 1.02 |
| 24 hr. | 2.11 | 3.17 |

*Not an example of the invention.

The data in Table 4 show that a foam having Fluorad ® FC-98 enhanced with DBEEA as antistatic additive has less increase in static decay time on exposure to UV light than does a foam having sodium tetraphenylboron as an additive.

EXAMPLE 4

Water Washing of Polyurethane Foams Containing Mixtures of Perfluoroalkyl Sulfonates A solution is formed by thoroughly mixing 7.93 g of Fluorad ® FC-98, 132.03 g DBEEA, 52.83 g of Polyol A, and 151.58 g of Polyol B and designated S12.

Foams are formed as in Example 1 except that Polyol C, an additional amine catalyst, designated amine catalyst B, a different silicone compound, and a blowing agent are used. Polyol C is a triol of about 3500 molecular weight, having a hydroxyl number of about 50 formed from a mixture of about 13 weight percent ethylene oxide and 87 weight percent propylene oxide. Amine Catalyst B is a mixture of delayed action amine catalysts commercially available from Union Carbide Corp. under the trade designation NIAX ® A-127. The silicone compound is polyalkyleneoxidemethylsiloxane copolymer commercially available from Union Carbide Corp. under the trade designation L-5810. The blowing agent is an admixture of 70 weight percent trichloromonofluoro methane commercially available from E.I. Dupont De Nemours under the trade designation Freon ® F-11 and 30 weight percent methylene chloride. The procedure of Example 1 is modified by adding the (liquid) blowing agent into a measured sample of masterbatch before the tin catalyst is added. The foam formulations are given in Table 5.

Samples of the foams are cut as in Example 1 and conditioned for 24 hours at 15% relative humidity. Static decay times are measured as in Example 1 except that the water washing step of FTS #101C, method 4046.1 is followed.

Each sample is soaked in deionized water three days, then squeezed to remove water. The samples are then squeezed between paper towels. Afterwards, each sample is reimmersed in water and squeezed to remove water. Reimmersion and squeezing is repeated several times and, finally, the samples are again squeezed between paper towels. The samples are allowed to air dry for 7 days. Then the static decay time is measured again by the same procedure. Mean static decay times are given in Table 5.

TABLE 5

| Effects of Water Washing on Antistatic Foams | | |
|---|---|---|
| Sample No. | 11 | 12 |
| Solution No. | S12 | S12 |
| Solution (g) | 6.0 | 11.0 |
| Polyol C (g) | 100 | 100 |
| TDI | 42.1 | 42.6 |
| Water | 3.2 | 3.2 |
| Silicone | 1.3 | 1.3 |
| Tin Catalyst | 0.25 | 0.275 |
| Amine Catalyst A | 0.04 | 0.04 |
| Amine Catalyst B | 0.28 | 0.28 |
| Blowing Agent | 11.5 | 11.5 |
| Static Decay before wash (sec.) | 3.70 | 1.90 |
| Static decay after wash (sec.) | 3.23 | 1.70 |

Table 5 shows low static decay times are retained by foams having Fluorad ® FC-98 enhanced by DBEEA as antistatic additive after said foams are washed.

EXAMPLE 5

Heat Aging of Polyurethane Foams Containing Mixtures of Perfluoroalkyl Sulfonates With Colorants A solution, designated S13 is prepared by thoroughly mixing 116.8 g Fluorad® FC-98, 1461.5 g DBEEA, 584.6 g of Polyol A and 1636.9 g of Polyol B. Foams of formulations listed in Table 6 are prepared as in Example 4.

Samples are cut as in Example 1 and except the size is 5×2×½ inch conditioned for 3 days at 4% relative humidity. Static decay time is measured as in Example 1, before and after heat aging for 24 hours at 140° C. Results are given in Table 6.

TABLE 6
Effects of Heat Aging On Antistatic Foams

| Sample No. | 13 | 14 | 15 |
|---|---|---|---|
| Solution No. | S13 | S13 | S13 |
| Solution (g) | 13 | 13 | 13 |
| Polyol C | 100 | 100 | 100 |
| TDI | 52.5 | 52.5 | 52.5 |
| Water | 4 | 4 | 4 |
| Silicone | 1.2 | 1.2 | 1.2 |
| Tin Catalyst | 0.30 | 0.30 | 0.30 |
| Amine Catalyst A | 0.09 | 0.09 | 0.09 |
| Blowing Agent | 8.0 | 8.0 | 8.0 |
| Color | — | 0.2* | 0.10** |
| Static Decay: | | | |
| initial | 4.14 | 4.54 | 4.77 |
| heat aged | 2.38 | 2.13 | 2.47 |

*A blue pigment, available from Day-Glo Color Corp. under the trade designation PPG ™ Phthalocyanine Blue is used.
**A violet dye commercially available from Milliken Chemicals under the trade designation X-80 violet is used.

The data in Table 6 show when Fluorad® FC-98 is used with DBEEA as an antistatic additive in conjunction with colorants, static dissipative activity is not lost by heat treatment at 140° C.

EXAMPLE 6

Preparation and Heat Aging of Polyurethane Foams Containing Mixtures of Perfluoroalkyl Sulfonates and Flame Retardants Foams are formed by the procedure of Example 4 using the formulations in Table 7 and Solution S13 of Example 5. The indicated flame retardants are added to the indicated samples of masterbatch after the indicated amount of Solution S13 is added, but before the blowing agent and tin catalyst are added.

Samples are cut and conditioned as in Example 5. Static decay times are measured before and after heat aging 24 hr at 140° C. Results of the measurements are reported in Table 7.

TABLE 7
Effect of Heat Aging Antistatic Foams Containing Flame Retardants

| Sample No. | 16 | 17 | 18 | 19 |
|---|---|---|---|---|
| Solution No. | S13 | S13 | S13 | S13 |
| Soln (g) | 13 | 13 | 13 | 13 |
| Polyol C | 100 | 100 | 100 | 100 |
| TDI | 52.5 | 52.5 | 52.5 | 52.5 |
| Water | 4.0 | 4.0 | 4.0 | 4.0 |
| Silicone | 1.2 | 1.2 | 1.2 | 1.2 |
| Tin Catalyst | 0.30 | 0.30 | 0.30 | 0.30 |
| Amine Catalyst A | 0.09 | 0.09 | 0.09 | 0.09 |
| Blowing Agent | 8.0 | 8.0 | 8.0 | 8.0 |
| Flame Retardant | — | 15* | 15** | 15*** |
| Static Decay: | | | | |
| initial | 4.14 | 1.07 | 4.49 | 2.03 |
| heat aged | 2.38 | 0.80 | 1.82 | 1.76 |

*The flame retardant is di(2-chloroethyl)phosphoro-ethyl di(2-chloroethyl)phosphate, commercially available from Olin Chemical Corp. under the trade designation Thermolin® 101.
**The flame retardant is pentabromodiphenyl oxide with an aromatic phosphate ester, commercially available from Great Lakes Chemical Corp. under the trade designation DE-60F "Special."
***The flame retardant is tris-(dichloroisopropyl)phosphate, commercially available from Stauffer Chemicals under the trade designation Fyrol® FR-2.

The data in Table 7 show that antistatic activity is improved when foams containing Fluorad® FC-98 and DEEBA, as well as certain phosphate flame retardants are heat aged for 24 hours at 140° C.

EXAMPLE 7

Use of a Sodium Salt of a Mixture of Perfluoroalkyl Sulfonic Acids in Polyurethane Foams About 175 g of Fluorad® FC-98 powder are dried in an oven at 120° C. for 4 hours then placed in a nitrogen-purged dry box to keep it dry. One hundred grams of the powder are thoroughly mixed with technical grade methanol and filtered through filter paper to separate about 0.2 g of unidentified solid from a filtrate. The filtrate is acidified using 4.93 g of glacial acetic acid to a pH of 4.

Meanwhile, 67.4 g of sodium tetraphenylboron are dissolved in 1.1 liters of deionized water and filtered through filter paper to produce a clear solution and insufficient solid to weigh. This solution is slowly mixed with the filtrate containing Fluorad® FC-98 to form a mixture. No temperature change is noted, but a while precipitate is immediately formed. The mixture is warmed to 40° C. in a water bath, then allowed to settle overnight. Then, the mixture is filtered through filter paper in a large coarse sintered glass funnel to yield solids and a filtrate.

The solids are dried in an oven at 120° C. for 5 hours, after which time, the solids are found to weight 69.5 g. The solids are believed to be potassium tetraphenylboron, because the potassium salt is known to be insoluble in a water/methanol mixture. The potassium tetraphenyl boron may, however, be somewhat impure.

Methanol and water are removed from the filtrate using a rotary evaporator, heated to 73° C. at full vacuum. A pale yellow solid (sodium salts of a mixture of perfluoroalkyl sulfonic acids) weighing 96.3 g is recovered and placed in a nitrogen-purged dry box.

Solution S14 is formed by thoroughly mixing 2.3 g of the pale yellow solid with 38.5 g of DBEEA, 15.4 g of Polyol A and 43.5 g of Polyol B. Solution S14 is analyzed, by emission spectroscopy, and it is found that 95 weight percent of the salt is sodium salt and 5 weight percent is potassium salt.

The procedure of Example 1 is used to prepare foams from Solution S14 and the other ingredients listed in Table 8. The indicated physical properties are measured as in Example 1 and recorded in Table 8.

TABLE 8
Foams Containing Sodium Salts of Perfluoro Sulfonic Acids

| Sample No. | 20 | 21 |
|---|---|---|
| Polyol B (g) | 100 | 100 |
| Index | 110 | 110 |
| TDI (g) | 48.9 | 48.9 |
| Water (g) | 3.6 | 3.6 |
| Silicone (g) | 1.0 | 1.0 |

TABLE 8-continued

| Foams Containing Sodium Salts of Perfluoro Sulfonic Acids | | |
|---|---|---|
| Amine Catalyst | 0.10 | 0.10 |
| Tin Catalyst | 0.225 | 0.25 |
| Solution S14 (g) | 10 | 10 |
| Rise Time (sec.) | 120 | 114 |
| Air Flow | 4.2 | 3.1 |
| Density (pcf) | 1.71 | 1.81 |
| Static Decay time for positive charge (sec.) | 1.00 | 0.76 |
| Static Decay time for negative charge (sec.) | 1.25 | 1.00 |

The data in Table 8 show that the sodium salt of mixtures of perfluoroalkyl sulfonic acids enhanced by DBEEA is an effective static decay additive in polyurethane foams.

We claim:

1. An organic polymer composition comprising an organic polymer having dispersed therein
   (a) at least one ionizable metal salt of a fluoroalkyl sulfonic acid and
   (b) an enhancer which increases the conductivity of said organic polymer in the presence of said salt of a fluoroalkyl sulfonic acid, but does not substantially increase the conductivity of said organic polymer in the absence of said salt.

2. The organic polymer composition of claim 1 wherein the salt of a fluoroalkyl sulfonic acid is soluble in the enhancer.

3. The organic polymer composition of claim 1 wherein the enhancer is selected from the group consisting of phosphate esters, salts of carboxylic acids, and esters of carboxylic acids.

4. The organic polymer composition of claim 1 wherein the salt of a fluoroalkyl sulfonic acid is the salt of a perfluoroalkyl sulfonic acid having from about 1 to about 20 carbon atoms.

5. The organic polymer composition of claim 4 wherein the salt of a perfluoroalkyl sulfonic acid is at least one salt of a perfluoroalkyl sulfonic acid having from about 1 to about 10 carbon atoms.

6. The organic polymer compositions of claim 5 wherein the salt of a perfluoroalkyl sulfonic acid is at least one salt of trifluoromethane sulfonic acid.

7. The organic polymer composition of claim 4 wherein the salt of a perfluoroalkyl sulfonic acid is an alkali metal salt of a perfluoroalkyl sulfonic acid.

8. The organic polymer composition of claim 1 wherein the organic polymer comprises a polyurethane, a polyolefin, poly(vinyl chloride), poly(vinylidene chloride), a polyester, a poly(vinyl aromatic), an acrylonitrile-butadiene-styrene polymer, a polycarbonate or a copolymer of an olefin with vinyl alcohol or with carbon monoxide.

9. The organic polymer composition of claim 8 containing from about 0.01 to about 10 percent by weight of at least one alkali metal salt of a fluoroalkyl sulfonic acid and from about 1 to about 25 mole of the enhancer per mole of alkali metal salt of a fluoroalkyl sulfonic acid.

10. The organic polymer composition of claim 8 wherein the polymer is a polyurethane.

11. The organic polymer composition of claim 1 which dissipates 99% of an applied static change charge of 5000 volts direct current within about 20 seconds.

12. The organic polymer composition of claim 11 which dissipates 99% of an applied static change of 5000 volts direct current within about 2 seconds.

13. The organic polymer composition of claim 12 which dissipates 99% of an applied static change of 5000 volts direct current within about 2 seconds after being heated to a temperature of at least about 110° C. for at least about 1 hour.

14. The organic polymer composition of claim 12 which dissipates 99% of an applied static change of 5000 volts direct current within about 2 seconds after being heated to a temperature of at least about 135° C. for at least about 1 hour.

15. The organic polymer composition of claim 12 which dissipates 99% of an applied static change of 5000 volts direct current within about 2 seconds after being heated to a temperature of about 150° C. for at least about 1 hour.

16. The organic polymer composition of claim 12 which dissipates 99% of an applied static change of 5000 volts direct current within about 2 seconds after exposure to ultraviolet radiation according to the procedure of ASTM G53 for at least about 8 hours.

17. The organic polymer composition of claim 16 which dissipates 99% of an applied static change of 5000 volts direct current within about 2 seconds after exposure to ultraviolet radiation according to the procedure of ASTM G53 for at least about 24 hours.

18. The organic polymer composition of claim 12 which dissipates 99% of an applied static change of 5000 volts direct current within about 2 seconds after exposure to water for at least about 8 hours.

19. The organic polymer composition of claim 1 wherein the enhancer is a phosphate ester.

20. An additive composition for increasing the conductivity of an organic polymer which comprises
   (a) at least one ionizable metal salt of a fluoroalkyl sulfonic acid, and
   (b) an enhancer which increases the conductivity of said organic polymer in the presence of said salt of a fluoroalkyl sulfonic acid, but does not substantially increase the conductivity of said organic polymer in the absence of said salt.

21. The additive composition of claim 20 wherein the enhancer is selected from the group consisting of phosphate esters, salts of a carboxylic acids and esters of carboxylic acids.

22. The additive composition of claim 20 wherein the metal salt of a fluoroalkyl sulfonic acid is soluble in the enhancer.

23. The additive composition of claim 20 wherein the salt of a fluoroalkyl sulfonic acid is the salt of a perfluoroalkyl sulfonic acid having from about 1 to about 20 carbon atoms.

24. The additive composition of claim 23 wherein the salt of a perfluoroalkyl sulfonic acid is the salt of a perfluoroalkyl sulfonic acid having from about 1 to about 10 carbon atoms.

25. The additive composition of claim 24 wherein the salt of a perfluoroalkyl sulfonic acid is a salt of trifluoromethane sulfonic acid.

26. The additive composition of claim 23 wherein the salt of a perfluoroalkyl sulfonic acid is an alkali metal salt of a perfluoroalkyl sulfonic acid having from about 1 to about 10 carbon atoms.

27. The additive composition of claim 20 containing from about 0.5 to about 100 moles of enhancer per mole of salt of fluoroalkyl sulfonic acid.

28. The additive composition of claim 27 containing from about 1 to about 25 moles of enhancer per mole of salt of fluoroalkyl sulfonic acid.

29. The additive composition of claim 20 wherein the enhancer is a phosphate ester.

30. An active hydrogen containing composition comprising an active hydrogen component or mixture of active hydrogen components having dispersed therein
   (a) at least one ionizable metal salt of a fluoroalkyl sulfonic acid, and
   (b) an enhancer which increases the conductivity of an organic polymer in the presence of said salt of a fluoroalkyl sulfonic acid, but does not substantially increase the conductivity of said organic polymer in the absence of said salt, wherein said salt of a fluoroalkyl sulfonic acid (a) and enhancer (b) are present in an amount sufficient to increase the conductivity of an organic polyisocyanate polymer prepared form said active hydrogen containing composition.

31. The active hydrogen containing composition of claim 30 wherein the enhancer is selected from the group consisting of phosphate ester, salts of carboxylic acids and esters of carboxylic acids.

32. The active hydrogen containing composition of claim 30 further comprising water.

33. The active hydrogen containing composition of claim 32 wherein water is present in an amount of from about 0 to about 6 weight percent based on weight of total active hydrogen composition.

34. The active hydrogen containing composition of claim 30 wherein the salt of a fluoroalkyl sulfonic acid is the salt of a perfluoroalkyl sulfonic acid having from about 1 to about 20 carbon atoms.

35. The active hydrogen containing composition of claim 34 wherein the salt of a perfluoroalkyl sulfonic acid is the salt of a perfluoroalkyl sulfonic acid having from about 1 to about 10 carbon atoms.

36. The active hydrogen containing composition of claim 35 wherein the salt of a perfluoroalkyl sulfonic acid is a salt of trifluoromethane sulfonic acid.

37. The active hydrogen containing composition of claim 34 wherein the salt of a perfluoroalkyl sulfonic acid is an alkali metal salt of a perfluoroalkyl sulfonic acid.

38. The active hydrogen containing composition of claim 30 containing from about 0.01 to about 10 weight percent salt of at least one fluoroalkyl sulfonic acid based on organic polyisocyanate polymer to be prepared from said active hydrogen containing composition and from about 0.5 to about 100 moles of enhancer per mole of salt of fluoroalkyl sulfonic acid.

39. The active hydrogen containing composition of claim 38 wherein there are from about 1 to about 25 moles of enhancer per mole of salt of fluoroalkyl sulfonate acid.

40. The active hydrogen containing composition of claim 30 wherein the enhancer is a phosphate ester.

* * * * *